US008564659B2

(12) United States Patent
Sekine et al.

(10) Patent No.: US 8,564,659 B2
(45) Date of Patent: Oct. 22, 2013

(54) FLOW LINE RECOGNITION SYSTEM

(75) Inventors: Naoki Sekine, Shizuoka (JP); Tomonori Ikumi, Shizuoka (JP); Shinji Saegusa, Shizuoka (JP); Takashi Koiso, Tokyo (JP); Masami Takahata, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/821,602

(22) Filed: Jun. 23, 2010

(65) Prior Publication Data

US 2011/0007152 A1 Jan. 13, 2011

(30) Foreign Application Priority Data

Jul. 13, 2009 (JP) ................. 2009-164968

(51) Int. Cl.
*H04N 7/18* (2006.01)
*G06K 9/00* (2006.01)

(52) U.S. Cl.
USPC .......................................... 348/135; 382/113

(58) Field of Classification Search
USPC ............... 348/135, 169, 150, 119, 43, 47, 46, 348/116, 120, 121; 382/113, 118, 173, 104, 382/106, 153
See application file for complete search history.

(56) References Cited

U.S. PATENT DOCUMENTS

| 8,218,816 | B2 * | 7/2012 | Sonoura | 382/103 |
| 2009/0003653 | A1 | 1/2009 | Takahata et al. | |
| 2009/0052740 | A1 | 2/2009 | Sonoura | |
| 2009/0195388 | A1 * | 8/2009 | Ikumi et al. | 340/572.1 |
| 2009/0257624 | A1 * | 10/2009 | Ikumi et al. | 382/113 |
| 2009/0268028 | A1 | 10/2009 | Ikumi et al. | |
| 2009/0319340 | A1 | 12/2009 | Sekine et al. | |

FOREIGN PATENT DOCUMENTS

| EP | 2006350751 | 12/2006 |
| JP | 2006-350751 A | 12/2006 |
| JP | 2007-003448 A | 1/2007 |
| JP | 2007-272441 A | 10/2007 |
| WO | 2005088962 | 9/2005 |

OTHER PUBLICATIONS

Japanese Office Action for corresponding JP Application No. 2009-164968 mailed May 10, 2011.
International Search Report EP 10 16 5442 dated Nov. 9, 2010.
Cui et al. "Multi-Modal Tracking of People Using Laser Scanners and Video Camera", Image and Vision Computing 26 (2008) pp. 240-252.
Punarjay, et al. "Panoramic Vision and Laser Range Finder Fusion for Multiple Person Tracking", IEEE/RSJ International Conf. on Intelligent Robots and Systems. Oct. 9-15, 2006. pp. 2949-2954.
Gate, et al. "Fast Pedestrian Detection in Dense Environment with a Laser Scanner and a Camera", 2009 IEEE 69th Vehicular Technology Conf.' Apr. 26-29, 2009, Barcelona, Spain. pp. 1-6.

* cited by examiner

*Primary Examiner* — Behrooz Senfi
(74) *Attorney, Agent, or Firm* — Patterson & Sheridan, LLP

(57) ABSTRACT

According to one embodiment, the flow line recognition system includes a first device, a first recording unit, a second device, a second recording unit and a generation unit. The first device detects a position of a moving object in a monitoring area by laser scanning. The second device detects a position of the moving object in a specific area, which is a part of the monitoring area, more accurately than the first device. The generation unit generates flow line information indicative of a path of the moving object moving in the monitoring area, based on the moving object information for the monitoring area recorded in the first recording unit, and the moving object information for the specific area recorded in the second recording unit.

16 Claims, 7 Drawing Sheets

| Laser flow line ID | Coordinates (X, Y) | Detection time | Processing flag |
|---|---|---|---|
|  |  |  |  |
|  |  |  |  |
|  |  |  |  |
|  |  |  |  |
|  |  |  |  |
|  |  |  |  |
| ⋮ | ⋮ | ⋮ | ⋮ |
27
F I G. 4
| Camera flow line ID | Coordinates (X, Y) | Detection time |
|---|---|---|
|  |  |  |
|  |  |  |
|  |  |  |
|  |  |  |
|  |  |  |
|  |  |  |
| ⋮ | ⋮ | ⋮ |
28
F I G. 5
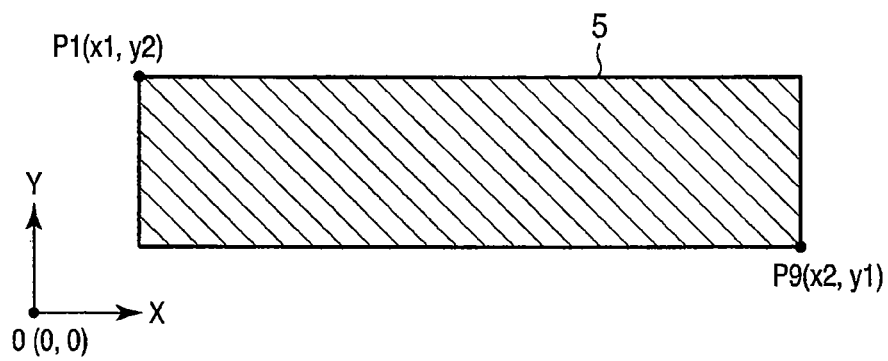
F I G. 6

| No | Area ID | X-coordinate range | Y-coordinate range |
|---|---|---|---|
| 1 | AID01 | x1~x2 | y1~y2 |

| Laser flow line ID | Coordinates (X, Y) | Detection time | Determination flag |
|---|---|---|---|
|  |  |  |  |
|  |  |  |  |
|  |  |  |  |
|  |  |  |  |
|  |  |  |  |
|  |  |  |  |
| ⋮ | ⋮ | ⋮ | ⋮ |

| Customer ID | |
|---|---|
| Coordinates (X, Y) | Detection time |
|  |  |
|  |  |
|  |  |
|  |  |
|  |  |
| ⋮ | ⋮ |

FLOW LINE RECOGNITION SYSTEM

CROSS-REFERENCE TO RELATED APPLICATIONS

This application is based upon and claims the benefit of priority from Japanese Patent Application No. 2009-164968, filed Jul. 13, 2009; the entire contents of which are incorporated herein by reference.

FIELD

Embodiments described herein relate generally to a flow line recognition system configured to recognize paths of people as flow lines.

BACKGROUND

Systems have been developed that recognize paths of customers who move in stores, such as supermarkets, convenience stores, etc. Conventionally, such systems include those that use camera images to recognize flow lines of customers (moving objects), those that use radio tags to recognize flow lines, and those that uses multi-laser scanners for the flow line recognition.

The flow line recognition system using camera images requires many cameras in order to cover a monitoring area entirely. Therefore, the number of cameras increases if the monitoring area becomes wider. If the cameras increase, the following problems occur.

(1) The capacity of storage devices for recording captured image data is inevitably large.

(2) The cameras require complicated control.

(3) The maintenance of the cameras becomes more costly.

Thus, the flow line recognition system using camera images is unsuitable for stores with a large sales floor space.

Since the flow line recognition system using radio tags does not use image data, it can comprise a small storage device. In order to accurately detect the positions of customers as moving objects, however, the number of radio tag readers needs to be increased. If the tag readers increase, radio-wave interference is caused between them, so that data on the radio tags cannot be read. Thus, the number of radio tag readers that can be installed within the monitoring area is physically limited. Consequently, the accuracy of this system is lower than that of the system that uses camera images.

According to this system, moreover, the radio tags need to be carried by the customers. To this end, a complicated operation is required such that, for example, one radio tag is affixed to each shopping cart.

According to the flow line recognition system using multi-laser scanners, on the other hand, it is unnecessary for anything to be carried by customers. However, this system detects customers (moving objects) by scanning with laser lights by means of the laser scanners. If the customers overlap one another in the direction of emission of the laser lights, those on the far side cannot be detected, although those on the near side can. Consequently, data having so far been used to track the far-side customers will disappear. Thus, this system is unsuitable for use in a busy monitoring area.

BRIEF DESCRIPTION OF THE DRAWINGS

FIG. 4 is a structural diagram showing data to be stored in a laser flow line database according to the same embodiment;

FIG. 5 is a structural diagram showing data to be stored in a camera flow line database according to the same embodiment;

FIG. 6 is a diagram used for illustrating a specific area according to the same embodiment;

FIG. 7 is a structural diagram showing data to be stored in a specific area database according to the same embodiment;

FIG. 8 is a structural diagram showing data to be stored in an extracted flow line database according to the same embodiment;

FIG. 9 is a structural diagram showing a final flow line file stored in a final flow line database according to the same embodiment;

DETAILED DESCRIPTION

In general, according to one embodiment, the flow line recognition system includes a first device, a first recording unit, a second device, a second recording unit, a generation unit. The first device detects a position of a moving object in a monitoring area by laser scanning. The first recording unit records position information indicative of the position of the moving object detected by the first device as moving object information for the monitoring area, along with time information indicative of a time when the moving object is in the detected position. The second device detects a position of the moving object in a specific area, which is a part of the monitoring area, more accurately than the first device. The second recording unit records position information indicative of the position of the moving object detected by the second device as moving object information for the specific area, along with time information indicative of a time when the moving object is in the detected position. The generation unit generates flow line information indicative of a path of the moving object moving in the monitoring area, based on the moving object information for the monitoring area recorded in the first recording unit, and the moving object information for the specific area recorded in the second recording unit.

Figure 1:
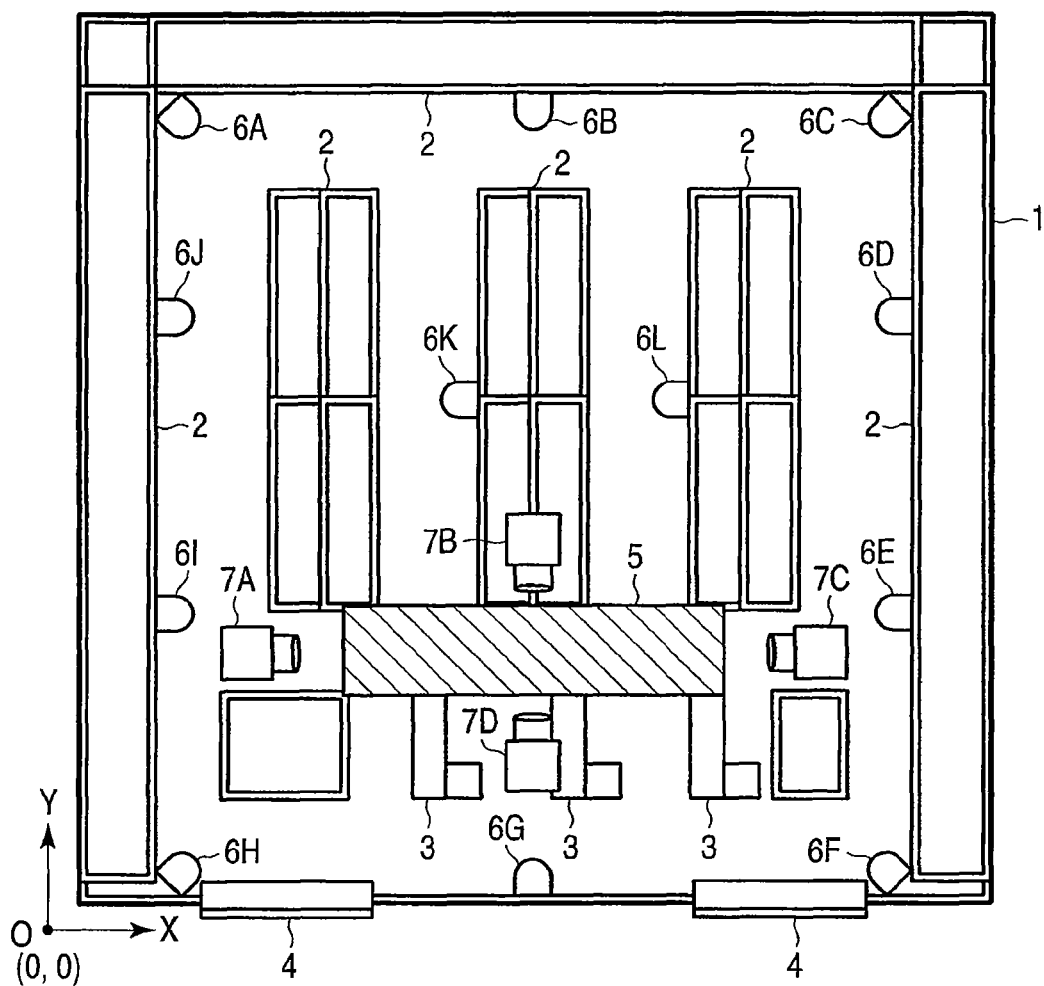
FIG. 1 is a plan view of a store to which one embodiment is applied.

FIG. 1 is a plan view of a store 1 in which the flow line recognition system of the present embodiment is constructed. In the store 1, commodity racks 2, checkout counters 3, and doorways 4 are located in predetermined positions. Each checkout counter 3 comprises a point-of-sales terminal and barcode scanner, which are individually used for accounting services.

In the present embodiment, the whole area of the store 1 except a block where the commodity racks 2 and checkout counters 3 are installed is defined as a monitoring area. Of the monitoring area, a hatched area 5, that is, an area on the side where the checkout counters 3 are accessed, as shown in FIG. 1, is defined as a specific area. The flow line recognition system is constructed so that it can recognize, as a flow line, a path along which a customer having entered the store through any of the doorways 4 moves through the monitoring area and specific area and leaves the store through any of the doorways 4.

This system uses a multi-laser scanner model and camera image model in combination. Specifically, the camera image model is adopted for the specified area 5, and the multi-laser scanner model for the monitoring area, that is, the whole area except the specific area 5.

In the monitoring area for which the multi-laser scanner model is adopted, a plurality of (12 in FIG. 1) laser scanners 6 (6A to 6L) are located individually in the positions shown in FIG. 1. Around the specific area 5 for which the camera image model is adopted, a plurality of (4 in FIG. 1) cameras 7 (7A to 7D) are located individually in the positions shown in FIG. 1.

Figure 3:
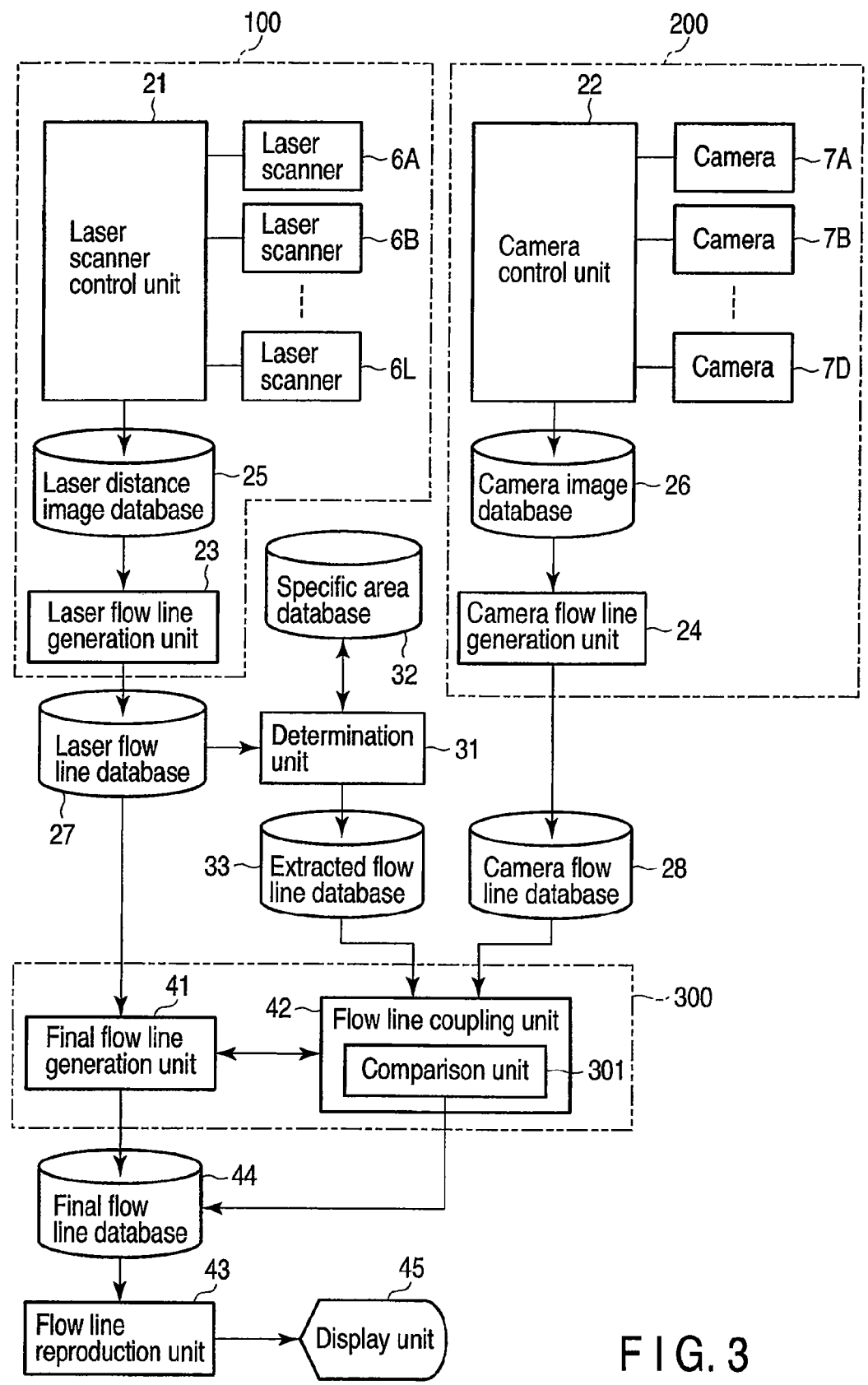
FIG. 3 is a block diagram showing one embodiment of a flow line recognition system.

FIG. 3 is a block diagram showing the principal configuration of the flow line recognition system. This system comprises a laser scanner control unit 21, camera control unit 22, laser flow line generation unit 23, camera flow line generation unit 24, laser distance image database 25, camera image database 26, laser flow line database 27, and camera flow line database 28.

The laser scanner control unit 21 controls a scanning operation of each laser scanner 6.

Figure 2:
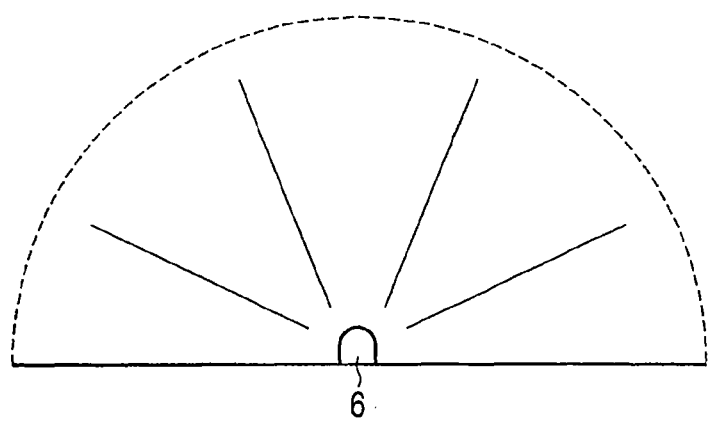
FIG. 2 is a diagram used for illustrating a laser light projected from a laser scanner according to the same embodiment.

As shown in FIG. 2, each laser scanner 6 scans the monitoring area with a laser light parallel to the floor surface so as to cover a wide angle of 180° at a height of 10 to 20 cm above floor level. The laser light emitted from the laser scanner 6 is reflected when it hits obstacles, such as stationary and moving objects. The reflected light returns to the laser scanner 6 as a projected light source.

The control unit 21 counts the time required for the return of the reflected light after the laser-light scanning by each laser scanner 6, in order to calculate a distance from each scanner 6 to the obstacle. Based on calculated values of distances from the obstacle in all scanning directions, the control unit 21 synthesizes a laser distance image for each laser scanner 6. The laser distance image contains information on the stationary and moving objects on a horizontal section corresponding to the height of projection of the laser light.

The control unit 21 records the laser distance image obtained for each laser scanner 6 in the laser distance image database 25. In doing this, the control unit 21 tags each laser distance image with information indicative of the laser scanner 6 from which the image is obtained and information indicative of the start time of scanning.

The laser flow line generation unit 23 generates laser flow line information based on data recorded in the laser distance image database 25.

Each laser scanner 6 constantly scans the same range in the same position. Thus, the laser length to stationary objects, such as walls or commodity racks, cannot change beyond the range of system errors.

The generation unit 23 analyzes laser distance images obtained from one and the same laser scanner 6 in a time series for individual pixels. Those pixels which have not changed for a predetermined time (e.g., 10 seconds) or more are detected as a background image.

If the background image is detected, its difference is obtained from each laser distance image of the same laser scanner 6 in ascending order of the start time of scanning. The generation unit 23 can extract the moving object by obtaining the difference of the background image. If a new moving object is extracted, the generation unit 23 issues a flow line ID (laser flow line ID) appropriate to this moving object.

The generation unit 23 tracks the extracted moving object. Then, the position of the moving object being tracked is detected in a fixed period. The generation unit 23 functions as a detection unit, which recognizes the moving object, based on the distance information obtained during the time interval required for the return of the reflected light after the laser-light scanning by the laser scanners 6A to 6L, and detects the position of the moving object.

The generation unit 23 converts the position of the moving object into orthogonal coordinates (X, Y) in the monitoring area. In the present embodiment, the lower left corner of the store 1 shown in FIG. 1 is assumed to be the origin O (0, 0) of the orthogonal coordinates (X, Y).

The generation unit 23 generates the laser flow line information every time the position of the moving object being tracked is detected. The laser flow line information contains the values of the orthogonal coordinates (X, Y) indicative of the position of the moving object, laser flow line ID issued for the moving object, and detection time information on the moving object. The detection time information is indicative of the start time of scanning of the laser distance image from which the moving object is extracted for the first time. The generation unit 23 records the laser flow line information in the laser flow line database 27.

FIG. 4 is a structural diagram showing data to be stored in the laser flow line database 27. The database 27 stores the laser flow line information containing the laser flow line ID, orthogonal coordinates, and detection time in ascending order of the detection time. The laser flow line information is tagged with a processing flag. The processing flag is "0" at the point in time when the corresponding laser flow line information is recorded in the laser flow line database 27. The processing flag becomes "1" when it is processed in a final flow line generation unit 41, which will be described later. Alternatively, the processing flag may be set so that it is "1" when it is recorded in the laser flow line database 27 and becomes "0" when processed.

The camera control unit 22 controls the image capture operation of each camera 7. Each camera 7 captures images of customers moving in the specific area 5 from each corresponding position shown in FIG. 1. The camera control unit 22 fetches image data captured by each camera and records it in the camera image database 26. In doing this, the camera control unit 22 tags each image data with information indicative of the camera used to capture the image data and information on the time of image capture.

The camera flow line generation unit 24 generates camera flow line information based on the camera image data recorded in the camera image database 26.

The camera flow line generation unit 24 extracts the moving object by processing the image data, captured by the cameras 7A to 7D, based on the known volume intersection method. If a new moving object is extracted, the generation unit 24 issues a flow line ID (camera flow line ID) appropriate to this moving object.

The generation unit 24 tracks the extracted moving object. Then, the position of the moving object being tracked is detected in a fixed period. The generation unit 24 functions as a detection unit, which recognizes the moving object, based on the image information captured by the cameras 7, and detects the position of the moving object.

The generation unit 24 converts the position of the moving object into orthogonal coordinates (X, Y) in the monitoring area.

The generation unit 24 generates the camera flow line information every time the position of the moving object being tracked is detected. The camera flow line information contains the values of the orthogonal coordinates (X, Y) indicative of the position of the moving object, camera flow line ID issued for the moving object, and detection time information on the moving object. The detection time information is indicative of the time of capture of the image from which the moving object is extracted for the first time. The generation unit 24 records the camera flow line information in the camera flow line database 28.

FIG. 5 is a structural diagram showing data to be stored in the camera flow line database 28. The database 28 stores the camera flow line information containing the camera flow line ID, orthogonal coordinates, and detection time in ascending order of the detection time.

The flow line recognition system using camera images recognizes moving objects by processing image data based on an image of the specific area 5 captured from above. Thus, the probability of losing track of the moving objects is lower than in the case of a flow line recognition system using multi-laser scanners that recognize moving objects by processing laser distance images on a horizontal section. Thus, the flow line recognition system using camera images can detect flow lines of moving objects more accurately than the flow line recognition system that uses multi-laser scanners.

A first device 100 that detects the position of each moving object in the monitoring area by laser scanning comprises the laser scanners 6, laser scanner control unit 21, and laser flow line generation unit 23. A second device 200 that detects the position of each moving object more accurately than the first device 100 comprises the cameras 7A to 7D, camera control unit 22, and camera flow line generation unit 24.

Returning to FIG. 3, the flow line recognition system further comprises a determination unit 31, specific area database 32, and extracted flow line database 33.

As shown in FIG. 6, the specific area 5 is rectangular in the orthogonal coordinate system. Therefore, if the orthogonal coordinates of points P1 and P2 at the upper left end and lower right end with respect to the origin O (0, 0) are given by (x1, y2) and (x2, y1), respectively, the specific area 5 is a set of point coordinates based on an X-coordinate range of x1 to x2 and Y-coordinate range of y1 to y2.

As shown in FIG. 7, the specific area database 32 stores the values x1 to x2 representative of the X-coordinate range and values y1 to y2 representative of the Y-coordinate range, corresponding to an area ID for the identification of the specific area 5.

The determination unit 31 fetches each item of laser flow line information recorded in the laser flow line database 27. Referring then to data on the coordinate values set in the specific area database 32, the determination unit 31 determines whether or not a moving object has just entered the specific area 5. If laser flow line information at the point in time when the specific area 5 is entered by the moving object is detected, the determination unit 31 records the laser flow line information as entry flow line information in the extracted flow line database 33.

Referring to the data on the coordinate values set in the specific area database 32, moreover, the determination unit 31 determines whether or not the moving object has just exited the specific area 5. If laser flow line information at the point in time when the specific area 5 is entered by the moving object is detected, the determination unit 31 records the laser flow line information as exit flow line information to the extracted flow line database 33.

FIG. 8 is a structural diagram showing data to be stored in the extracted flow line database 33. The database 33 stores the laser flow line information containing the laser flow line ID, orthogonal coordinates, and detection time in the ascending order of the detection time. The laser flow line information is tagged with a determination flag. The determination flag is "1" when the laser flow line information is the entry flow line information, and "0" for the exit flow line information. Alternatively, the determination flag may be set so that for the entry flow line information is "0" and that for the exit flow line information is "1".

Figure 10:
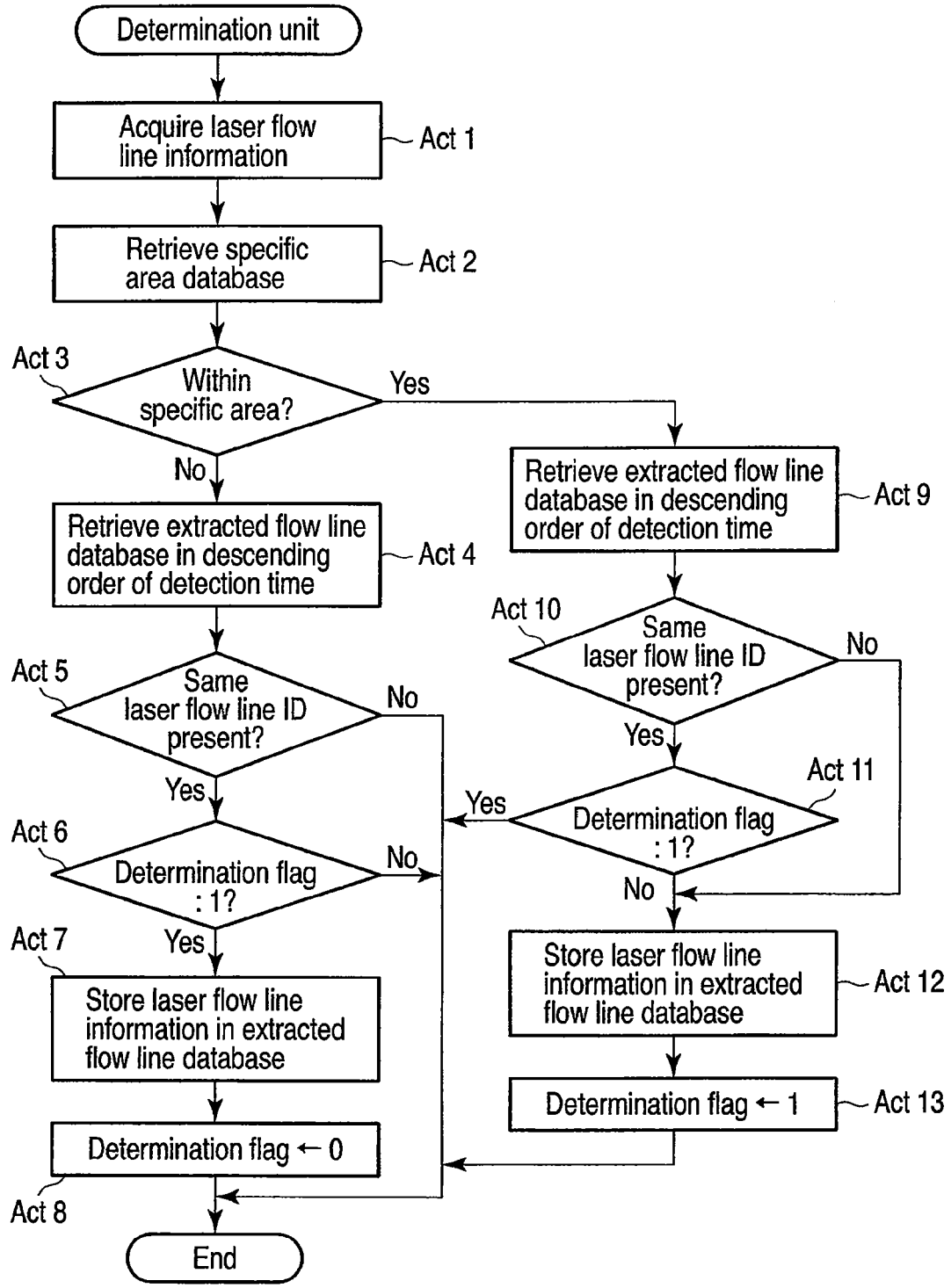
FIG. 10 is a flowchart showing a processing procedure of a determination unit according to the same embodiment.

The determination unit 31 executes processing of a procedure shown in the flowchart of FIG. 10 every time the laser flow line information is written to the laser flow line database 27.

First, the determination unit 31 acquires laser flow line information Lk written in the database 27 (Act 1). The determination unit 31 retrieves the specific area database 32 with orthogonal coordinates (Xk, Yk) of the laser flow line information Lk (Act 2). Then, the determination unit 31 determines whether or not a position represented by the orthogonal coordinates (Xk, Yk) is within the specific area 5 (Act 3). If the X- and Y-coordinates Xk and Yk are "x1≤Xk≤x2" and "y1≤Yk≤y2", respectively, the laser flow line information L is data on a moving object located within the specific area 5. If the X-coordinate is not "x1≤Xk≤x2" or if the Y-coordinate is not "y1≤Yk≤y2", the laser flow line information Lk is data on a moving object located outside the specific area 5.

If the position represented by the orthogonal coordinates (Xk, Yk) is determined to be outside the specific area 5 (NO in Act 3), the determination unit 31 retrieves data from the extracted flow line database 33 with the laser flow line ID of the laser flow line information Lk, in descending order of the detection time (Act 4). Then, the presence of laser flow line information Lm containing the same flow line ID is determined (Act 5).

If the laser flow line information Lm is not detected (NO in Act 5), the laser flow line information Lk is data on a moving object having not entered the specific area 5. In this case, the determination unit 31 terminates processing for the laser flow line information Lk.

If the laser flow line information Lm is detected (YES in Act 5), the determination unit 31 checks a determination flag Fm of the laser flow line information Lm (Act 6). If the determination flag Fm is "0" (NO in Act 6), the laser flow line information Lk is data on a moving object determined to have exited the specific area 5 by a previous determination process. In this case, the determination unit 31 terminates the processing for the laser flow line information Lk.

If the determination flag Fm is "1" (YES in Act 6), the laser flow line information Lk is data on a moving object determined to have not exited the specific area 5 by the previous determination process, that is, a moving object having just exited the specific area 5. In this case, the determination unit 31 stores the laser flow line information Lk in the extracted flow line database 33 (Act 7). In doing this, the determination unit 31 sets the determination flag Fm of the laser flow line information Lk to "0" (Act 8). Thereupon, the determination unit 31 terminates the processing for the laser flow line information Lk.

If the position represented by the orthogonal coordinates (Xk, Yk) is determined to be within the specific area 5 (YES in Act 3), the determination unit 31 retrieves the data from the extracted flow line database 33 with the laser flow line ID of the laser flow line information Lk, in descending order of the detection time (Act 9). Then, the presence of the laser flow line information Lm containing the same flow line ID is determined (Act 10).

If the laser flow line information Lm is not detected (NO in Act 10), the laser flow line information Lk is data on a moving object determined to have not entered the specific area 5 by the previous determination process, that is, a moving object having just entered the specific area 5. In this case, the determination unit 31 stores the laser flow line information Lk in the extracted flow line database 33 (Act 12). In doing this, the determination unit 31 sets the determination flag Fm of the laser flow line information Lk to "1" (Act 13). Thereupon, the determination unit 31 terminates the processing for the laser flow line information Lk.

If the laser flow line information Lm is detected (YES in Act 10), the determination unit 31 checks the determination flag Fm of the laser flow line information Lm (Act 11). If the determination flag Fm is not "1" (NO in Act 11), the laser flow line information Lk is data on a moving object having just entered the specific area 5 again after having once exited. In this case, the determination unit 31 stores the laser flow line information Lk in the extracted flow line database 33 (Act 12). In doing this, the determination unit 31 sets the determination flag Fm of the laser flow line information Lk to "1" (Act 13). Thereupon, the determination unit 31 terminates the processing for the laser flow line information Lk.

If the determination flag Fm is "1" (YES in Act 11), the laser flow line information Lk is data on a moving object determined to have entered the specific area 5 by the previous determination process. In this case, the determination unit 31 terminates the processing for the laser flow line information Lk.

As the determination unit 31 executes the processes of Acts 1 to 13, the laser flow line information with the determination flag Fm at "1" and laser flow line information with the determination flag Fm at "0" are recorded in a time series in the extracted flow line database 33. The laser flow line information with the determination flag Fm at "1" is the laser flow line information Lk obtained when the specific area 5 is entered by the moving object. The laser flow line information with the determination flag Fm at "0" is the laser flow line information Lk obtained when the specific area 5 is exited by the moving object.

Returning to FIG. 3, the flow line recognition system further comprises the final flow line generation unit 41, a flow line coupling unit 42, a flow line reproduction unit 43, a final flow line database 44, and a display unit 45. The display unit 45 is a color display, for example.

Figure 11:
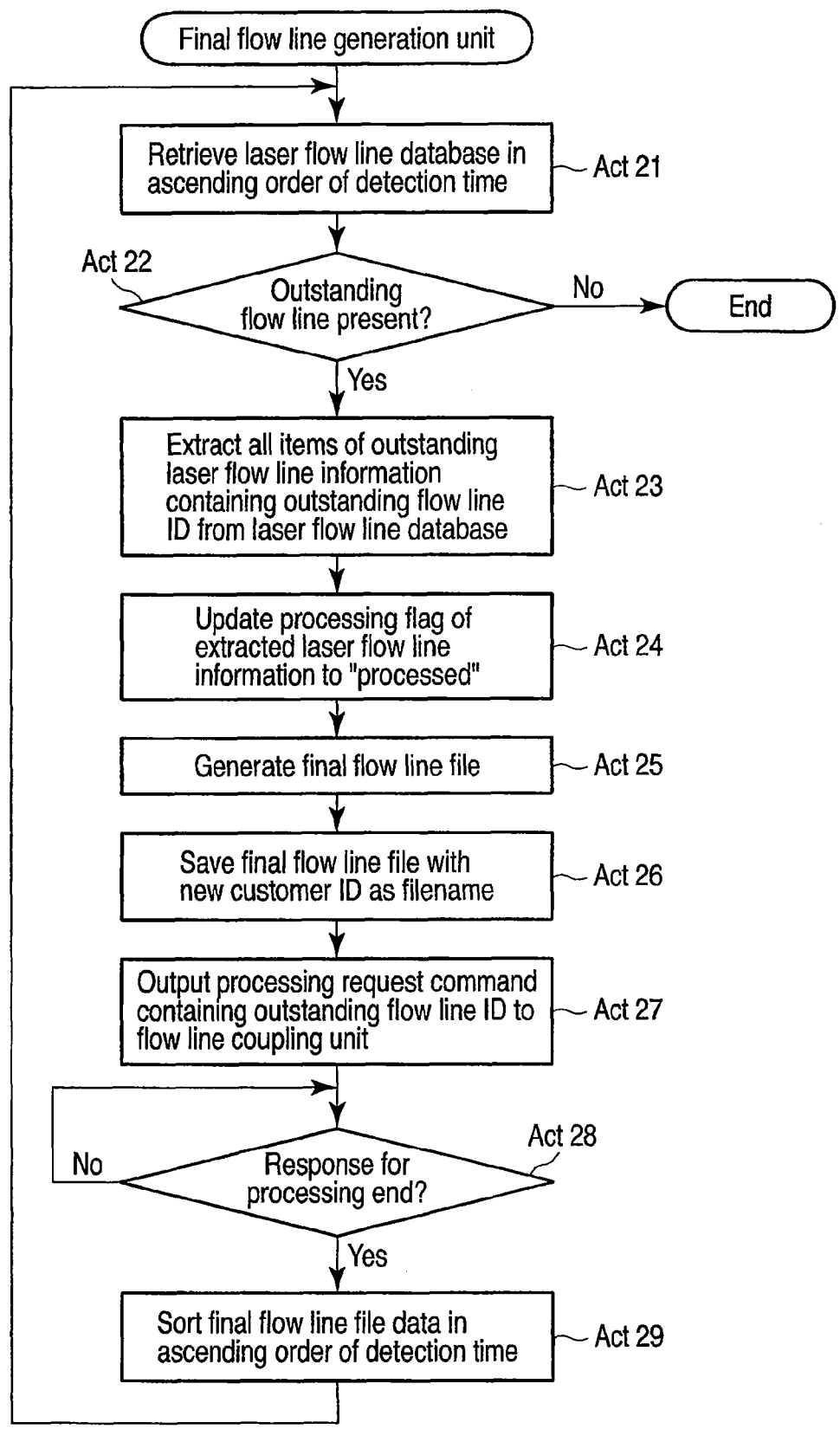
FIG. 11 is a flowchart showing a processing procedure of a final flow line generation unit according to the same embodiment.

The final flow line generation unit 41 generates final flow line data for each customer based on processing of a procedure shown in the flowchart of FIG. 11. A program is automatically started to execute this processing at a predetermined time. Alternatively, the program is started to execute the processing when a predetermined command is input by the operation of an input device, such as a keyboard.

First, the generation unit 41 retrieves the laser flow line information stored in the laser flow line database 27 in ascending order of the detection time (Act 21). Then, the presence of laser flow line information Ln containing a processing flag F at "0" is determined (Act 22).

If the laser flow line information Ln is detected (YES in Act 22), the generation unit 41 further retrieves the laser flow line database 27 with the flow line ID (outstanding flow line ID) of the laser flow line information Ln. Of the laser flow line information containing the same flow line ID as the outstanding flow line ID, all items of laser flow line information Lnn with the processing flag F at "0" are extracted in ascending order of the detection time (Act 23). The generation unit 41 updates a processing flag Fn of all the extracted items of laser flow line information Lnn to "1" (Act 24).

The generation unit 41 generates a final flow line file 50 of the data structure shown in FIG. 9. Then, the orthogonal coordinates of all the items of laser flow line information Lnn and detection time data are stored in the final flow line file 50 in ascending order of the detection time (Act 25).

The generation unit 41 generates a new customer ID. This customer ID is saved as a filename in the final flow line database 44 (Act 26).

The generation unit 41 generates a processing request command C1. The command C1 contains the new customer ID, outstanding flow line ID, and detection time of the laser flow line information Ln. The generation unit 41 transmits the command C1 to the flow line coupling unit 42 (Act 27).

Figure 12:
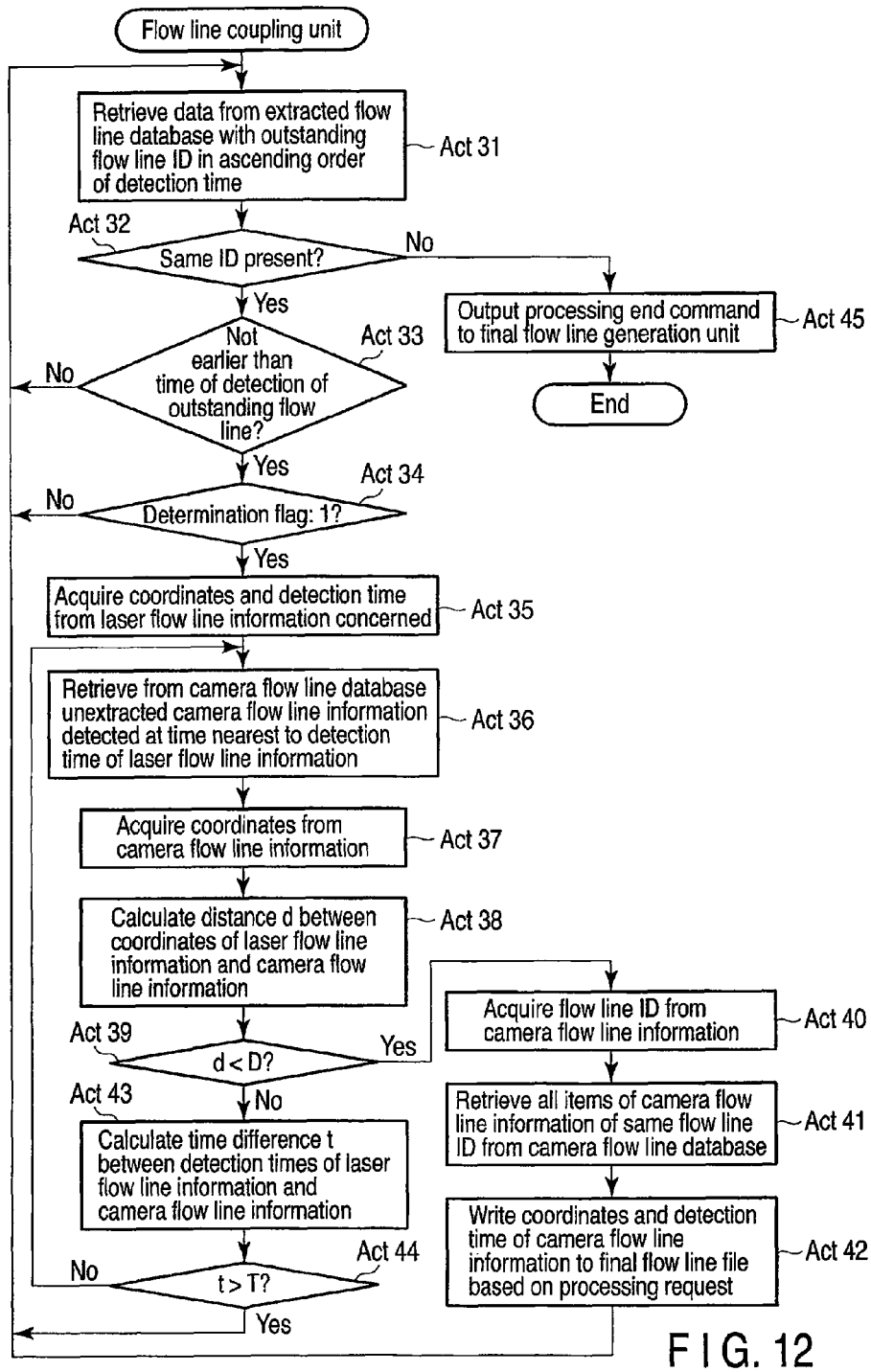
FIG. 12 is a flowchart showing a processing procedure of a flow line coupling unit according to the same embodiment.

On receipt of the command C1 from the generation unit 41, the coupling unit 42 couples the entry or exit flow line information to the camera flow line information based on the procedure shown in the flowchart of FIG. 12.

First, the coupling unit 42 retrieves data from the extracted flow line database 33 in ascending order of the detection time (Act 31). Then, the presence of laser flow line information Li that agrees with the outstanding flow line ID contained in the command C1 is determined (Act 32).

If the laser flow line information Li is detected (YES in Act 32), the coupling unit 42 determines whether or not a detection time Ti of the laser flow line information Li is preceded by a detection time Tc contained in the command C1 (Act 33).

If the detection time Ti is earlier than the detection time Tc (NO in Act 33), the laser flow line information Li is data on a customer having made a purchase earlier than a customer to whom the customer ID contained in the command C1 is allocated. In this case, the coupling unit 42 continues to retrieve the extracted flow line database 33 (Act 31).

If the detection time Ti is later than the detection time Ti (YES in Act 33), the laser flow line information Li is data on the customer to whom the customer ID contained in the command C1 is allocated. In this case, the coupling unit 42 checks out a determination flag Fi of the laser flow line information Li (Act 34).

If the determination flag Fi is "0" (NO in Act 34), the laser flow line information Li is data at the time of exit of the moving object from the specific area 5. In this case, the coupling unit 42 continues to retrieve the extracted flow line database 33 (Act 31).

If the determination flag Fi is "1" (YES in Act 34), the laser flow line information Li is data at the time of entry of the moving object into the specific area 5. In this case, the coupling unit 42 acquires data on orthogonal coordinates (Xi, Yi) and the detection time Ti from the laser flow line information Li (Act 35).

The coupling unit 42 retrieves the camera flow line database 28. Then, it extracts one item of camera flow line information Rj of which the detection time is nearest to the detection time Ti (Act 36).

The coupling unit 42 acquires orthogonal coordinates (Xj, Yj) of the camera flow line information Rj (Act 37). Then, it calculates a distance d from a point specified by the orthogonal coordinates (Xj, Yj) to a point specified by the orthogonal coordinates (Xi, Yi) (Act 38).

The coupling unit 42 determines whether or not the distance d is less than a predetermined threshold D (Act 39). The threshold D is set to one meter or less, e.g., 80 cm. If the distance d is less than the threshold D (YES in Act 39), the camera flow line information Rj and laser flow line information Li are regarded as items of flow line information on one and the same customer.

In this case, the coupling unit 42 acquires the camera flow line ID from the camera flow line information Rj (Act 40). Then, it retrieves the camera flow line database 28 and extracts all items of camera flow line information Rjj containing the same camera flow line ID (Act 41).

The coupling unit 42 opens the final flow line file 50, of which the filename is given by the customer ID contained in the command C1, through the final flow line database 44. Then, the coupling unit 42 sequentially writes to the file 50 the orthogonal coordinates and data on the detection times of all items of camera flow line information Rjj extracted from the camera flow line database 28 (Act 42).

When the data writing is finished, the coupling unit 42 continues to retrieve the extracted flow line database 33 (Act 31).

If the distance d is not less than the threshold D (NO in Act 39), the camera flow line information Rj and laser flow line information Li are regarded as items of flow line information on another customer. In this case, the coupling unit 42 calculates a time difference t between a detection time Tj of the camera flow line information Rj and the detection time Ti of the laser flow line information Li (Act 43).

The coupling unit 42 determines whether or not the time difference t is greater than a predetermined threshold T. The threshold T is set to one minute or less, e.g., 30 seconds (Act 44).

If the time difference t is not greater than the predetermined value T (NO in Act 43), the coupling unit 42 continues to retrieve the camera flow line database 28 (Act 36). Then, the coupling unit 42 extracts the information Rj of which the detection time Tj is nearest to the detection time Ti, out of unextracted camera flow line information. If the camera flow line information Rj is extracted, the processes of Acts 37 to 44 are executed again.

If the time difference t exceeds the threshold T (YES in Act 43), the coupling unit 42 returns to the process for the retrieval of the extracted flow line database 33 (Act 31).

If the retrieval of the extracted flow line database 33 is finished (NO in Act 32), the coupling unit 42 outputs a response command C2 for the termination of processing to the final flow line generation unit 41 (Act 45). The command C2 contains the customer ID in the processing request command C1.

The generation unit 41 having output the processing request command C1 in Act 27 of FIG. 11 waits for the response command C2 for the termination of processing (Act 28). On receipt of the command C2 from the coupling unit 42 (YES in Act 28), the generation unit 41 opens the final flow line file 50, of which the filename is given by the customer ID contained in the command C1, through the final flow line database 44. Then, the generation unit 41 rearranges the items of final flow line information (orthogonal coordinates and detection time) stored in the file 50 in ascending order of the detection time (Act 29).

Thus, the final flow line information stored in the final flow line file 50 is a combination of flow line information for the pursuit of a path of a customer moving in the specific area 5 and flow line information for the pursuit of a path of the same customer moving in the monitoring area exclusive of the specific area 5.

The generation unit 41 and flow line coupling unit 42 constitute a generation unit 300, which generates flow line information indicative of a path of a moving object moving in the store 1, based on items of moving object information recorded in the laser flow line database 27 and camera flow line database 28. The coupling unit 42 comprises a comparison unit 301 that compares respective position information and time information of the in-store moving object information and in-specific-area moving object information.

The flow line reproduction unit 43 causes the display unit 45 to display a screen that indicates a layout of the store 1. Then, a flow line of the customer moving in the store 1 is reproduced on the screen, based on the final flow line information stored in the final flow line file 50.

When this is done, a flow line recognized by the flow line recognition system using multi-laser scanners is displayed in the monitoring area exclusive of the specific area 5. On the other hand, a flow line recognized by the flow line recognition system using camera images is displayed in the specific area 5.

In a large supermarket, an area in front of the checkout counters 3 is often jammed with customers waiting to pay or moving around, shopping.

According to the flow line recognition system of the present embodiment, the specific area 5 is located in front of the checkout counters 3. The flow line recognition system using camera images is adopted for the specific area 5. This system can detect moving objects more accurately than the flow line recognition system using multi-laser scanners. Accordingly, the flow line recognition system of the present embodiment has an effect that it can highly accurately recognize customer flow lines even in the jammed specific area 5.

On the other hand, the flow line recognition system using multi-laser scanners is adopted for the area other than the specific area 5. Although the accuracy of this system is lower than that of the flow line recognition system of the camera-image type, the construction and maintenance of the system are economical, that is, have low costs. The larger the monitoring area, as in a large supermarket, the greater this advantage is.

This invention is not limited directly to the embodiment described above, and in carrying out the invention, its constituent elements may be embodied in modified forms without departing from the spirit or scope of the invention.

In the embodiment described above, the flow line recognition system using camera images is used as the second device 200. However, the second device 200 is not limited to the flow line recognition system of that type. In short, it is necessary only that the second device 200 be able to detect the position of each moving object more accurately than in the flow line recognition system that uses multi-laser scanners for the first device 100.

In the embodiment described above, the specific area 5 is located in front of the checkout counters 3. However, the specific area 5 is not limited to this location. Further, the specific area is not limited to a rectangular shape.

In the embodiment, a plurality of specific areas 5 may be arranged in the monitoring area. In this case, the cameras 7A to 7D, camera control unit 22, camera image database 26, camera flow line generation unit 24, and camera flow line database 28 are provided as a systematic group for each of the specific areas. The determination unit 31 tags laser flow line information for the entry into or exit from each specific area with an area ID for the specific area 5 concerned. The coupling unit 42 couples the laser flow line information to the camera flow line information with reference to the camera flow line database 28 of the group identified by the area ID of the laser flow line information.

In the embodiment described above, items of flow line information on the same moving object are coupled by matching the laser flow line information and camera flow line information extracted into the extracted flow line database 33.

However, the method of coupling the items of flow line information is not limited to this. For example, the items of flow line information on the same moving object may be coupled by matching the laser flow line information and camera flow line information in the laser flow line database 27.

However, the laser flow line information extracted into the extracted flow line database 33 is information for the entry into or exit from the specific area 5. Thus, the number of necessary items of laser flow line information for the determination of coupling can be considerably reduced by using the method of the present embodiment. As a result, the processing load required by the flow line coupling unit 42 can be considerably reduced.

In the embodiment described above, the laser flow line information and camera flow line information are coupled on condition that the space between each two adjacent positions is not greater than a predetermined value and the time difference is minimal. However, the coupling condition is not limited to this and may be combined with other conditions.

In the embodiment described above, the determination unit 31 is configured to detect the flow line information for the entry or exit of each moving object into or from the specific area 5. However, the camera flow line information recorded in the camera flow line database 28, like the laser flow line information, contains the orthogonal coordinates (X, Y) and detection time data. As in the case of the above-described embodiment, therefore, the determination unit 31 may be configured to detect the flow line information for the entry or exit of each moving object into or from the specific area 5 from the camera flow line information and record it to the extracted flow line database 33.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A flow line recognition system comprising:
   a plurality of first devices each of which is located in one of a plurality of positions in a monitoring area to detect a position of a moving object in the monitoring area;
   a first recording unit which records first moving object information including first position information indicative of the position of the moving object detected by the first devices and first time information indicative of a time when the moving object is in the detected position;
   a second device which is located around a specific area to detect a position of the moving object in the specific area, which is a part of the monitoring area, more accurately than the first devices;
   a second recording unit which records second moving object information including second position information indicative of the position of the moving object detected by the second device and second time information indicative of a time when the moving object is in the detected position;
   a comparison unit which compares the first moving object information to the second moving object information; and
   a coupling unit which couples the first moving object information and the second moving object information as coupled information for a particular moving object if, based on the comparison, a difference between the first position information and the second position information is not greater than a first predetermined value and if, based on the comparison, a difference between the first time information and the second time information is not greater than a second predetermined value.

2. The system of claim 1, wherein each of the first devices comprises a laser scanner which scans the monitoring area with a laser light parallel to a floor surface and a detection unit which recognizes the moving object, based on distance information obtained during a time interval required for the return of a reflected light beam after the laser-light scanning by the laser scanner, and detects the position of the moving object.

3. The system of claim 1, wherein the second device comprises a camera which captures an image of the specific area and a detection unit which recognizes the moving object, based on image information captured by the camera, and detects the position of the moving object.

4. The system of claim 1, further comprising a determination unit which determines whether or not the moving object enters the specific area, based on the first position information detected by the first devices, wherein the comparison unit compares the first moving object information to the second moving object information if the determination unit determines that the moving object has entered the specific area.

5. The system of claim 4, wherein each of the first devices comprises a laser scanner which scans the monitoring area with a laser light parallel to a floor surface and a detection unit which recognizes the moving object, based on distance information obtained during a time interval required for the return of a reflected light beam after the laser-light scanning by the laser scanner, and detects the position of the moving object.

6. The system of claim 1, further comprising a determination unit which determines whether or not the moving object enters the specific area, based on the second position information detected by the second device, wherein the comparison unit compares the first moving object information to the second moving object information if the determination unit determines that the moving object has entered the specific area.

7. The system of claim 6, wherein the second device comprises a camera which captures an image of the specific area and a detection unit which recognizes the moving object, based on image information captured by the camera, and detects the position of the moving object.

8. The system of claim 1, further comprising a determination unit which determines whether or not the moving object exits the specific area, based on the first position information detected by the first devices, wherein the comparison unit compares the first moving object information to the second moving object information if the determination unit determines that the moving object has exited the specific area.

9. The system of claim 8, wherein each of the first devices comprises a laser scanner which scans the monitoring area with a laser light parallel to a floor surface and a detection unit which recognizes the moving object, based on distance information obtained during a time interval required for the return of a reflected light beam after the laser-light scanning by the laser scanner, and detects the position of the moving object.

10. The system of claim 1, further comprising a determination unit which determines whether or not the moving object exits the specific area, based on the second position information detected by the second device, wherein the comparison unit compares the first moving object information to the second moving object information if the determination unit determines that the moving object has exited the specific area.

11. The system of claim 10, wherein the second device comprises a camera which captures an image of the specific area and a detection unit which recognizes the moving object, based on image information captured by the camera, and detects the position of the moving object.

12. A flow line recognition system comprising:
a plurality of laser scanners each of which is located in one of a plurality of positions in a monitoring area and scans the monitoring area with a laser light parallel to a floor surface;
a first detection unit which recognizes a moving object, based on distance information obtained during a time interval required for the return of a reflected light beam after the laser-light scanning by the laser scanners, and detects a position of the moving object;
a first recording unit which records first moving object information including first position information indicative of the position of the moving object detected by the first detection unit and first time information indicative of a time when the moving object is in the detected position;
a camera which is located around a specific area, which is a part of the monitoring area, and captures an image of the specific area;
a second detection unit which recognizes the moving object, based on image information captured by the camera, and detects a position of the moving object;
a second recording unit which records second moving object information including second position information indicative of the position of the moving object detected by the second detection unit and second time information indicative of a time when the moving object is in the detected position;
a comparison unit which compares the first moving object information and the second moving object information; and
a coupling unit which couples the first moving object information and the second moving object information as coupled information on a particular moving object, if a difference between the first position information and the second position information is not greater than a first predetermined value and if a difference between the first time information and the second time information is not greater than a second predetermined value.

13. The system of claim 12, further comprising a determination unit which determines whether or not the moving object enters the specific area, based on the first position information detected by the first detection unit, wherein the comparison unit compares the first moving object information to the second moving object information if the determination unit determines that the moving object has entered the specific area.

14. The system of claim 12, further comprising a determination unit which determines whether or not the moving object enters the specific area, based on the second position information detected by the second detection unit, wherein the comparison unit compares the first moving object information to the second moving object information if the determination unit determines that the moving object has entered the specific area.

15. The system of claim 12, further comprising a determination unit which determines whether or not the moving object exits the specific area, based on the first position information detected by the first detection unit, wherein the comparison unit compares the first moving object information to the second moving object information if the determination unit determines that the moving object has exited the specific area.

16. The system of claim 12, further comprising a determination unit which determines whether or not the moving object exits the specific area, based on the second position information detected by the second detection unit, wherein the comparison unit compares the first moving object information to the second moving object information if the determination unit determines that the moving object has exited the specific area.

* * * * *